United States Patent [19]

Arthur

[11] 3,764,876

[45] Oct. 9, 1973

[54] CAPSTAN CONTROL SYSTEM FOR A TAPE DRIVE

[75] Inventor: William C. Arthur, Boulder, Colo.

[73] Assignee: Storage Technology Corporation, Boulder, Colo.

[22] Filed: Oct. 1, 1971

[21] Appl. No.: 185,611

[52] U.S. Cl. .......... 318/326

[51] Int. Cl. .......... H02p 5/16

[58] Field of Search .......... 318/313, 318, 326–328, 318/341, 314; 330/107, 109; 307/230

[56] References Cited

UNITED STATES PATENTS

| | | | |
|---|---|---|---|
| 3,582,550 | 6/1971 | Latanzi | 318/318 |
| 3,599,063 | 8/1971 | Nanai | 318/327 |
| 3,621,354 | 11/1971 | Fawcett | 318/341 |
| 3,659,169 | 4/1972 | Waddicor | 318/341 |
| 3,646,417 | 2/1972 | Cassie | 318/318 |
| 3,293,522 | 12/1966 | Lewis | 318/327 |
| 3,268,788 | 8/1966 | Branco | 318/313 |
| 3,629,721 | 12/1971 | Fordule | 330/107 |

*Primary Examiner*—Bernard A. Gilheany
*Assistant Examiner*—Thomas Langer
*Attorney*—Richard E. Kurtz et al.

[57] ABSTRACT

A capstan control system for controlling the movement of magnetic tape past a magnetic head. The system controls the velocity of magnetic tape across the read/write head in a tape drive, rapidly accelerates the tape to a predetermined read/write velocity, linearly controls the read/write velocity about the predetermined velocity, linearly increases the tape speed to rewind velocity, linearly controls the rewind velocity, decreases the capstan velocity from rewind velocity to read/write velocity and stops the capstan during the read, write and rewind operations.

10 Claims, 8 Drawing Figures

CAPSTAN CONTROL SYSTEM FOR A TAPE DRIVE

BACKGROUND OF THE INVENTION

1. Field of the Invention

This invention relates to tape drive systems and more particularly to high performance tape drive systems of the type utilized in a computer system.

Tape drives of this type comprise a magnetic head, a capstan for driving the tape past the magnetic head, a capstan motor for driving the capstan, and a capstan control circuit for controlling the capstan motor.

In general, the capstan control circuit must consistently provide short fixed gaps between records on the magnetic tape. This requires both rapid deceleration from the write velocity to zero velocity and rapid acceleration from zero velocity to the desired write velocity. In addition, a steady-state write velocity must also be closely maintained. Similar acceleration and velocity requirements exist for read and rewind operations of the tape drive.

2. The Prior Art

In a high performance tape drive such as the IBM 2420 model 5 computer magnetic tape unit described in that company's bulletin file No. S/360–05, the capstan control circuit is of a "bang-bang" type. In this type of system, a saturated, high power drive is terminated at approximately 80 percent of desired tape velocity and a low power drive is applied until the capstan velocity reaches 100 percent of the steady-state velocity for write and read operations. When the capstan slows down below the steady-state velocity, the low power drive is turned on. The low power drive then alternates between "on" and "off" to maintain the desired steady-state velocity. Thus the amount of drive for both the high power drive and low power drive is fixed during the write and read operations and in no way is proportional to the difference between the desired steady-state velocity and the actual velocity. The same is true during the rewind operation. In such a system, the steady-state velocity error may be quite high.

In order to selectively drive the capstan motor as a function of velocity, phototransistors have been utilized in combination with a tachometer disc and mask to generate a sinusoidal signal having a frequency representing the velocity of the capstan. The sinusoidal signal is then applied to a detector to obtain a logic level square wave signal having a frequency representing the capstan velocity. However, the detector is very sensitive to sine wave dc level shifts caused by unpredictable phototransistor responsitivity and temperature variations. In order to cancel out the characteristic DC level for a particular phototransistor and compensate for DC level changes due to temperature variations, rather complex temperature compensation circuitry has been utilized in combination with a potentiometer for initial DC level adjustment.

High speed rewind in such a prior art system has been achieved by abruptly increasing the capstan drive to a fixed level to rapidly accelerate the capstan. This is undesirable since it results in high power amplifier dissipation levels and may not permit sufficient time to reduce the field current on the reel motors of the drive. The lower field current is required to reduce the motor back e.m.f. constant so the reel motors can operate at rewind speeds.

SUMMARY OF THE INVENTION

It is an object of this invention to achieve a given capstan velocity in a tape drive with a high degree of accuracy.

In accordance with this object, a capstan control system is provided for comparing an analog signal representing the instantaneous velocity of the capstan with a reference signal representing the desired steady-state capstan velocity during a particular tape drive operation. The resulting error signal having a component proportional to the difference between the instantaneous capstan velocity and the desired steady-state capstan velocity is then amplified to drive the capstan motor.

In further accordance with the objective, the amplified error signal provides low power drive to the capstan motor only when the capstan velocity has increased to a predetermined velocity level. As the capstan velocity approaches the desired steady-state velocity, the low power drive diminishes to zero. When the capstan velocity is below the predetermined velocity level, a high power drive is applied to the capstan motor.

In still further accordance with this object, the error signal includes a component proportional to the integral of the difference between the instantaneous velocity and the desired steady-state velocity. This component of the error signal permits the motor drive to increase with the length of time that the error signal exists. Without the integral component, the amplified error signal might not be sufficient to accelerate a high friction system to the desired steady-state velocity. With the integral component, the motor drive can increase sufficiently to force the velocity error to zero even in a high friction system.

In still further accordance with this object, the error signal provides saturated drive to the capstan motor below the predetermined capstan velocity and linear drive to the capstan motor above the predetermined velocity.

In further accordance with this object of the invention, the analog signal representing the instantaneous capstan velocity is generated by a digital-to-analog converter means. The number of clock pulses generated between tachometer pulses is converted to an analog signal. By utilizing the same power supply for both the digital to analog converter and the comparison amplifier, any variations in the power supply are self-cancelling. Furthermore, by utilizing operational amplifiers to generate the error signals, the error signal is immune to variations in the power supply. In addition, the digital-to-analog converter includes a plurality of transistors having associated output resistances corresponding to the various counter stages. By having the transistors corresponding to the two higher counts off at read/write velocity, the effect of velocity errors due to variations in saturated voltage drop from transistor to transistor is minimized.

In still further accordance with this object, the tachometer pulses are generated by a phototransistor which is coupled to a digital encoder circuit through a tachometer preamplifier circuit comprising an operational amplifier. By utilizing the common mode rejection properties of the operational amplifier, the effects of temperature variation and the responsivity of the phototransistor are eliminated. The frequency of the tachometer pulses therefore accurately represents the capstan velocity.

It is another object of this invention to achieve a linear change of speed going from a read/write velocity to a high speed rewind velocity thereby reducing the linear power amplifier dissipation to an allowable level and also allowing time to reduce the field current on the reel motors.

In accordance with this object, the reference signal increases linearly from the predetermined level to a higher level representing the high speed rewind velocity. While the reference signal is increasing to the higher level, the capstan motor will be driven by the amplified error signal until the reference signal reaches the higher level and the error signal goes to zero.

DETAILED DESCRIPTION OF A PREFERRED EMBODIMENT

Figure 1:
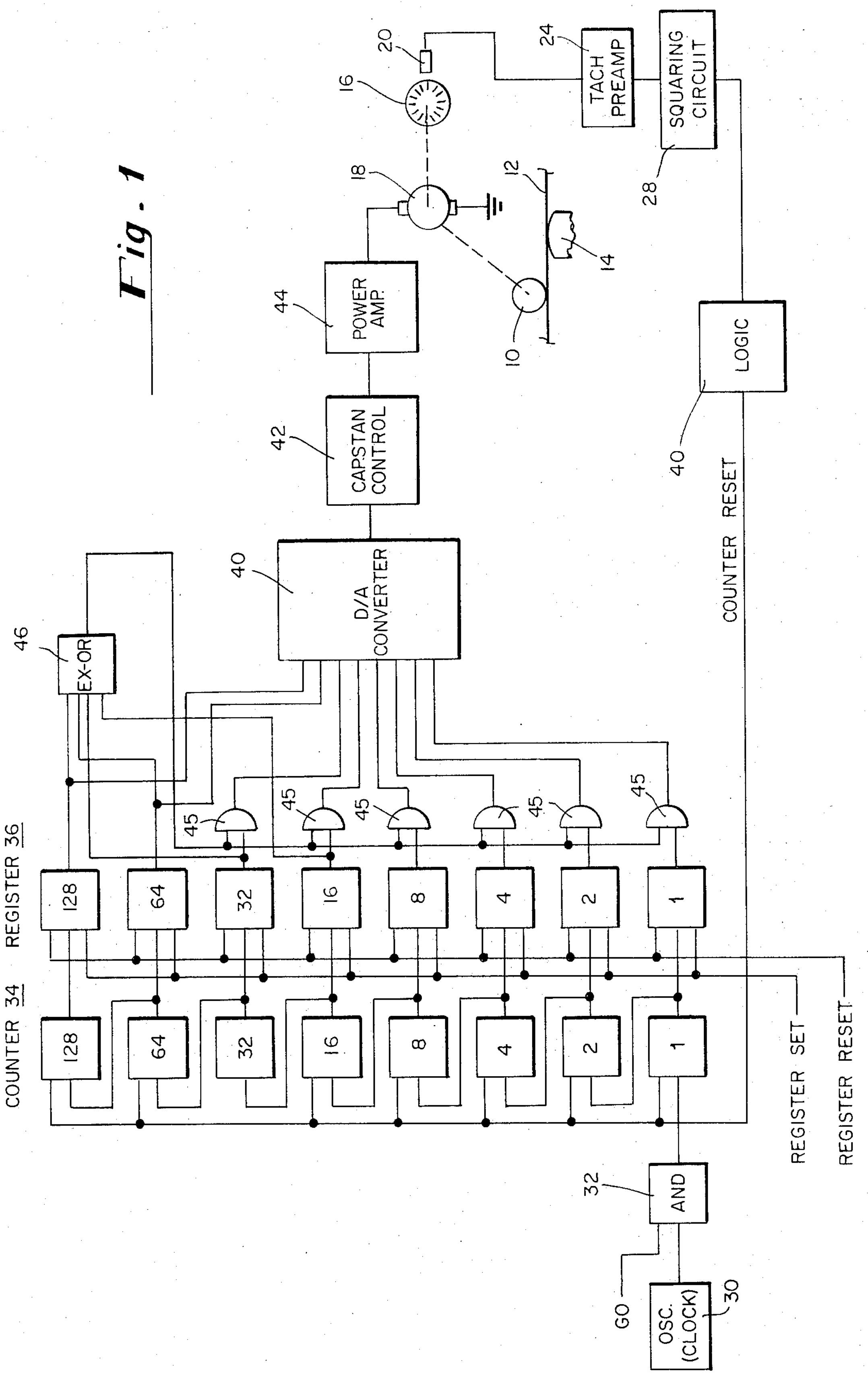
FIG. 1 is a block diagram of a tape drive system.
Figure 1A:
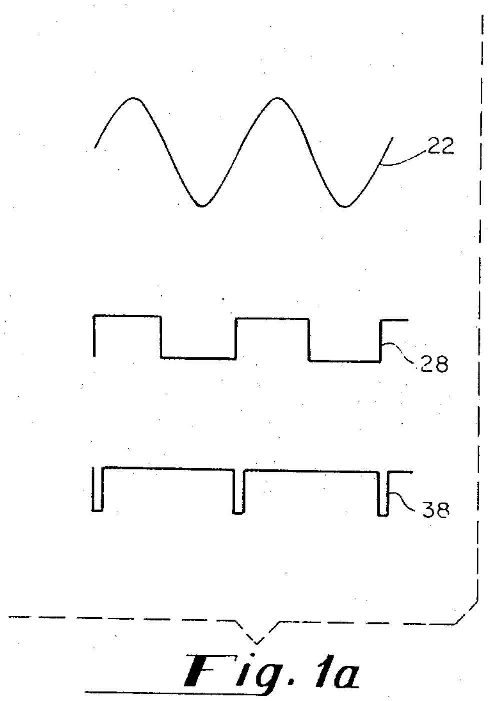
FIG. 1*a* graphically illustrates waveforms generated by the tape drive system of FIG. 1 in controlling the capstan.

Referring to FIG. 1, a system for controlling the angular velocity of a capstan 10 and thus the movement of a tape 12 past a magnetic head 14 will now be described. In order to control the capstan velocity, it is first necessary to detect the velocity. In this connection, a glass tachometer disc 16 having a plurality of equally spaced radial lines is mounted on an armature of a capstan motor 18. As the capstan 10 is rotated by the capstan motor 18, the lines on the tachometer disc 16 interrupt a light beam directed at a lens associated with light sensor in the form of a phototransistor 20. The tachometer sine wave signal 22 generated by the phototransistor 20 and shown in FIG. 1*a* may then be utilized to determine the capstan velocity. Initially, the signal 22 is applied to a tachometer preamplifier 24 and then converted to a series of tach pulses 25 shown in FIG. 1*a* by a digital encoder or squaring circuit 28. It will be understood that each positive (or negative) transition in the square wave signal 26 represents $\pi d/n$ inches of tape travel since the last positive (or negative) transition, where $d$ is the capstan diameter and $n$ is the number of lines around the tachometer disc 16. The average capstan velocity is then inversely proportional to the period of time between positive (or negative) transitions.

In order to determine the period of time between the transitions, the number of clock pulses generated by a fixed frequency oscillator 30 between tach pulses 28 are counted. The clock pulses are applied through an AND gate 32 to a counter 34. The accumulated count is then stored in a register 36 in response to a SET signal. When the AND gate 32 is enabled by a GO logic signal, the clock pulses enter the counter 34 having binary counter stages 34(1–128). The count accumulated between counter reset pulses 38 generated by a logic circuit 39 in response to the tach pulses 26 represents the instantaneous capstan velocity. The digital output from the register 36 is then converted to an analog signal at a digital-to-analog converter 40 for application to a capstan control circuit 42.

In accordance with one important aspect of the invention, an error signal is generated at the output of the capstan control circuit 42 and then amplified by a power amplifier 44 to drive the capstan motor 18 under linear control. The amplified error signal which represents the deviation of the instantaneous capstan velocity from a reference velocity provides linear control of the capstan velocity. However, the capstan velocity is not under linear control at all times. Prior to the time the clock pulse count drops below "240," the input to the analog-to-digital converter 40 is clamped at a count corresponding to "192" and the output from the converter 40 is constant. (The "192" count represents a velocity slightly in access of the steady-state velocity for the read and write operations and the "240" count represents about 80 percent of that velocity). This may be accomplished by the use of AND gates 45 which inhibit the output from register stages 36(1, 2, 4, 8, 16, & 32) in the absence of an enabling pulse from the EXCLUSIVE-OR gate 46. Since the enabling pulse is only provided when the one of the register stages 36(16, 32, 64 or 128) is not set or when the count fails to reach "240," the input to converter 40 will be clamped at a count of "192" until the capstan reaches the predetermined velocity corresponding to a count less than "240."

Figure 2:
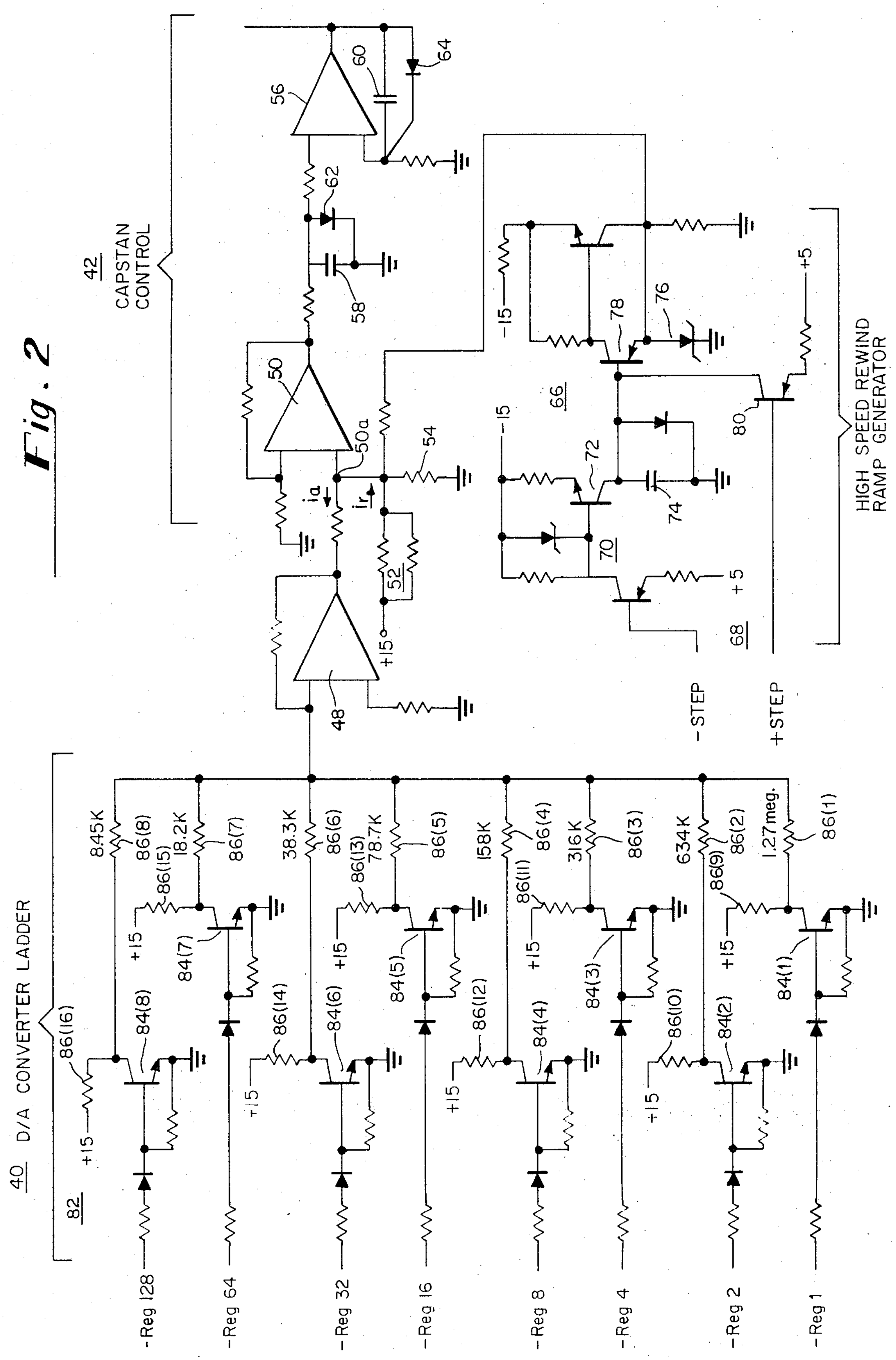
FIG. 2 is a schematic diagram of a digital-to-analog converter and a capstan control circuit shown in block diagram form in FIG. 1.

The capstan control circuit 42 which provides the linear capstan control in accordance with one important aspect of the invention will now be described with reference to FIG. 2. The analog signal representing the instantaneous capstan velocity which is generated at the output of the converter 40 is first applied to the first operational amplifier 48 of the capstan control circuit. The output of the amplifier 48 which ranges from a −8 volts to a −3 volts is then applied to a second operational amplifier 50 which compares the analog signal to a reference signal representing the reference velocity for a particular operation. In the case of the read and write operations, the reference signal corresponding to the desired steady-state velocity is provided by a +15 volt source in combination with resistors 52 and 54. As a result of the current summing of currents $i_r$ and $i_a$ performed by the operational amplifier 50 at an input terminal 50*a*, an error signal representing a comparison between the analog input signal and the reference signal is obtained from the output of the operational amplifier 50 which is then applied to a third operational amplifier 56. An integrating capacitor 58 is also provided to obtain an error signal including a component proportional to the difference between the instantaneous capstan velocity and the desired steady-state capstan velocity as well as a component proportional to the integral of that difference.

When the capstan control circuit begins to provide linear control, i.e., the capstan velocity reaches a predetermined velocity level corresponding to the "240 count," the input to the operational amplifier 48 becomes more positive (e.g., about 80 millivolts) than it was when the control circuit was clamped by an input signal corresponding to a count representing a capstan velocity in excess of the desired steady-state velocity. As the analog input signal to the input of the operational amplifier 50 approaches the reference signal, and the desired steady-state capstan velocity is reached, the error signal generated at the output of the operational amplifier 50 goes to zero. If the capstan velocity then falls below the desired steady-state velocity, an error signal is again generated to bring the capstan velocity back up to the desired steady-state velocity. As should now be clear, the purpose of clamping the capstan control circuit is to clamp the integrator to prevent the accumulation of a large error signal during the time in which the capstan is reaching the predetermined level of velocity. In this connection, integrating operational amplifier 56 is clamped at both the input and the output at approximately +0.3 volts by diodes 62 and 64 parallel with the compensation capacitor 58 and the integrating capacitor 60 respectively. Since the capstan control circuit operates on negative voltages only during linear control, this slightly positive clamping voltage has no effect on the circuit.

The foregoing describes the operation of the capstan control circuit 42 during write or read operations of the tape drive. During these operations, the reference signal applied to the input of the second amplifier 50 is provided by the +15 volts supply in combination with the resistors 52 and 54. The reference signal is modified for linear capstan control when the tape drive is in a rewind operation.

The modification of the reference signal is achieved by a rewind ramp generator circuit 66 under the control of logic signals "+ Step Up" and "− Step Up" applied at logic terminals 68. Upon receiving a "+ Step Up" logic signal, a current source 70 comprising a − 15 volt power supply in combination with a transistor 72 begins to charge a capacitor 74 negatively until the voltage level on the capacitor is clamped by a zener diode 76 located in the emitter circuit of a transistor 78. During the period in which the capacitor 74 is being charged negatively, the capstan velocity increases. When the charging is completed and the reference signal voltage reaches a final level, the output of the amplifier 50 will go to zero at a desired steady-state high speed rewind velocity. The rewind velocity may, for example, be 500 inches per second of tape or 2 (500/*D*) radians per second of capstan velocity. This velocity is determined by the selected zener diode and the various resistor values at the input of the operational amplifier 50 and is maintained at the desired steady-state high speed rewind velocity in a manner similar to the way in which the read and write steady-state velocities are maintained when the reference signal is generated by the +15 volt power supply in combination with the resistors 52 and 54. When high speed rewind is completed, the "+ Step Up" level drops and the capacitor 74 is discharged in 2 milliseconds by shorting the capacitor 74 out with the transistor 80. With the particular ramp generator shown, the reference signal across the zener diode 76 will linearly increase from approximately zero volts to a −7.5 volts as the capacitor 74 is charged before clamping by the diode 76.

In further accordance with this invention, the error signal generated by the capstan control circuit is relatively immune to fluctuations in power supply voltages and tolerances in components. In this connection, it will be noted that the digital-to-analog converter 40 comprises a ladder network including a plurality of transistors 84 (1–8) and associated output resistors 86 (1–8). The base of each of the transistors 84 (1–8) is coupled to a respective stage of the register 36. Note the values of the different resistors 86 (1–16 as listed below) are chosen such that the output resistances representing the higher counts are smaller than the output resistances representing the lower counts:

86 (9) + 86 (1) = 1.28 meg
86 (10)+ 86 (2) = 640 K
86 (11)+ 86 (3) = 320 K
86 (12)+ 86 (4) = 160 K
86 (13)+ 86 (5) = 80 K
86 (14)+ 86 (6) = 40 K
86 (15)+ 86 (7) = 20 K
86 (16)+ 86 (8) = 10 K By choosing the resistance values in this manner, variations in the saturated voltage drop across the various transistors 84 (1–8) do not affect the input to the first operational amplifier 48 in any significant manner since the transistors having a smaller output resistances are not conductive when the capstan velocity approaches the desired steady-state velocity for a particular mode. This minimizes the capstan velocity error at the desired steady-state velocities for write, read and rewind operations.

In a further effort to minimize the capstan error velocity, the +15 volt power supply for the digital-to-analog converter 40 is the same as the +15 volt power supply providing the reference signal at the capstan control circuit 42. Any fluctuation in the +15 volt power supply will therefore be self-cancelling at the input to the second operational amplifier 50. Of course, the operational amplifiers 48, 50 and 56 are in themselves insensitive to power supply variations.

Of course, the linear control of the capstan velocity can be no more accurate than the instantaneous capstan velocity detected at the phototransistor 20. Therefore, in accordance with another very important aspect of the invention, the accuracy in detection of the instantaneous velocity is greatly improved by means of the tachometer preamplifier 24.

Figure 4:
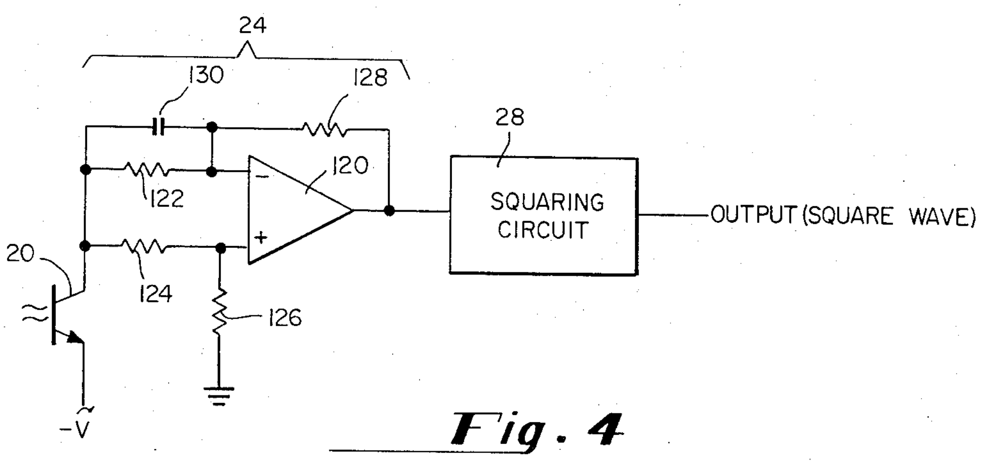
FIG. 4 is a schematic diagram of the tachometer preamplifier circuit.

As shown in FIG. 4, the tachometer preamplifier circuit, which eliminates necessity for complicated temperature compensation circuitry while also eliminating the necessity for an initial DC level adjustment, comprises an operational amplifier 120 having input terminals **120*a* and 120*b* connected to the output of the phototransistor 20 by summing resistors 122 and 124. A current offset resistor 126 and a feedback resistor 128 is also provided. In order to provide equal DC gain on each leg, the resistances of the resistors 122 and 124 are equal as are the resistances for the resistors 128 and 126. The capacitance of a capacitor 130** is chosen to provide an appropriate corner frequency for the frequency response of the circuit.

Figure 5:
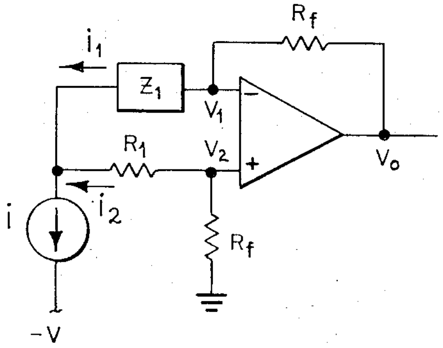
FIG. 5 is an equivalent circuit for the tachometer preamplifier of FIG. 4.

In order to render the circuit immune to variations in DC levels, the common mode rejection properties of the operational amplifier 120 are utilized as will now be described with reference to FIG. 5.

The phototransistor 20 is essentially a current device; therefore, the equation for $V_0/I$ may be derived as follows:

Let $Z_1 = (R_1/CS)/[R_1 + (1/CS)] = R_1/(R_1CS + 1)$
($S$ is Laplace Operator)
& $R_1 = R_{122} = R_{124}$; $R_f = R_{126} = R_{128}$ Making the basic operational amplifier assumptions:
1. $V_1 = V_2$ in linear zone.
2. There is no current flow into the Operational Amplifier terminals.

$$i = i_1 + i_2$$
$$i_1 = (V_0 - V_1)/R_f$$
$$i_2 = -(V_2/R_f)$$
$$i = [(V_0 - V_1)/R_f] - (V_2/R_f) = 1/R_f\,(V_0 - 2V_1) \quad \text{(Assumption 1)} \quad (1)$$
$$i_2R_2 = i_2\,R_1 = i_1\,Z_1 \quad \text{(Assumption 2)}$$

or $$i_1 = (R_1/Z_1)\,i_2 = (R_1/Z_1)\,(i - i_1)$$
$$i_1 = (R_1/Z_1)\,i/[1 + (R_1/Z_1)] = R_1\,i/(Z_1 + R_1) \quad (2)$$

$V_1 = V_0 - i_1R_f$. Substituting into Equation (1)

$$i = (1/R_f)\,[V_0 - 2V_0 + 2i_1R_f] = 2i_1 - (V_0/R_f)\,. \quad (3)$$

Substituting $i_1$ from Equation (2) into Equation (3)

$$i = 2\,[R_1i/(Z_1 + R_1)] - (V_0/R_f)$$

or $$i\,[1 - 2\,(R_1)/(Z_1 + R_1)] = -(V_0/R_f)$$
$$i\,[(Z_1 + R_1 - 2R_1)/(Z_1 + R_1)] = i\,[(Z_1 - R_1)/(Z_1 + R_1)] = -(V_0/R_f)$$
$$V_0/i = -[(Z_1 - R_1)/(Z_1 + R_1)]\,R_f$$

Substituting for $Z_1$.

$$\frac{V_0}{i} = -\left[\frac{\frac{R_1}{R_1CS+1} - R_1}{\frac{R_1}{R_1CS+1} + R_1}\right]R_f = -\left[\frac{R_1 - R_1^2CS - R_1}{R_1 + R_1^2CS + R_1}\right]R_f$$
$$= \left[\frac{R_1^2CS}{R_1^2CS + 2R_1}\right]R_f = \left[\frac{R_1CS}{R_1CS + 2}\right]R_f = \frac{R_f}{2}\left[\frac{R_1CS}{\frac{R_1C}{2}S + 1}\right]$$

Substituting $S = i\omega$ and setting $\omega = 0$.

$$V_0/i = 0$$

Figure 6:
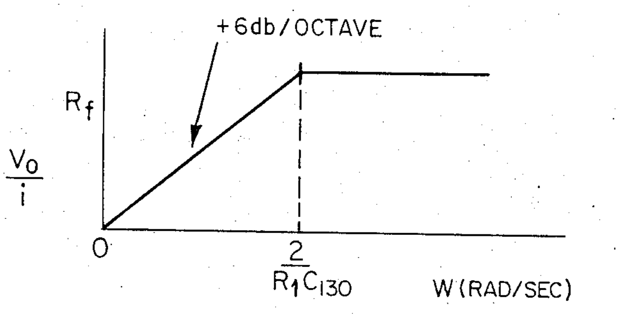
FIG. 6 is a frequency response plot for the tachometer preamplifier of FIG. 4.

Therefore, the amplifier rejects the DC component of the signal. The high frequency response is:

$$V_0/i = R_f$$

and the frequency response plot is as shown in FIG. 6. By selecting the corner frequency ($\omega_c = 2/R_1C_{130}$) for the acceleration of the capstan, i.e., the lower the acceleration the lower the corner frequency, the detector output will provide a transition for each light-to-dark or dark-to-light change at the phototransistor. Note, there is no necessity for temperature compensation circuitry nor a DC level correcting potentiometer.

Figure 3A:
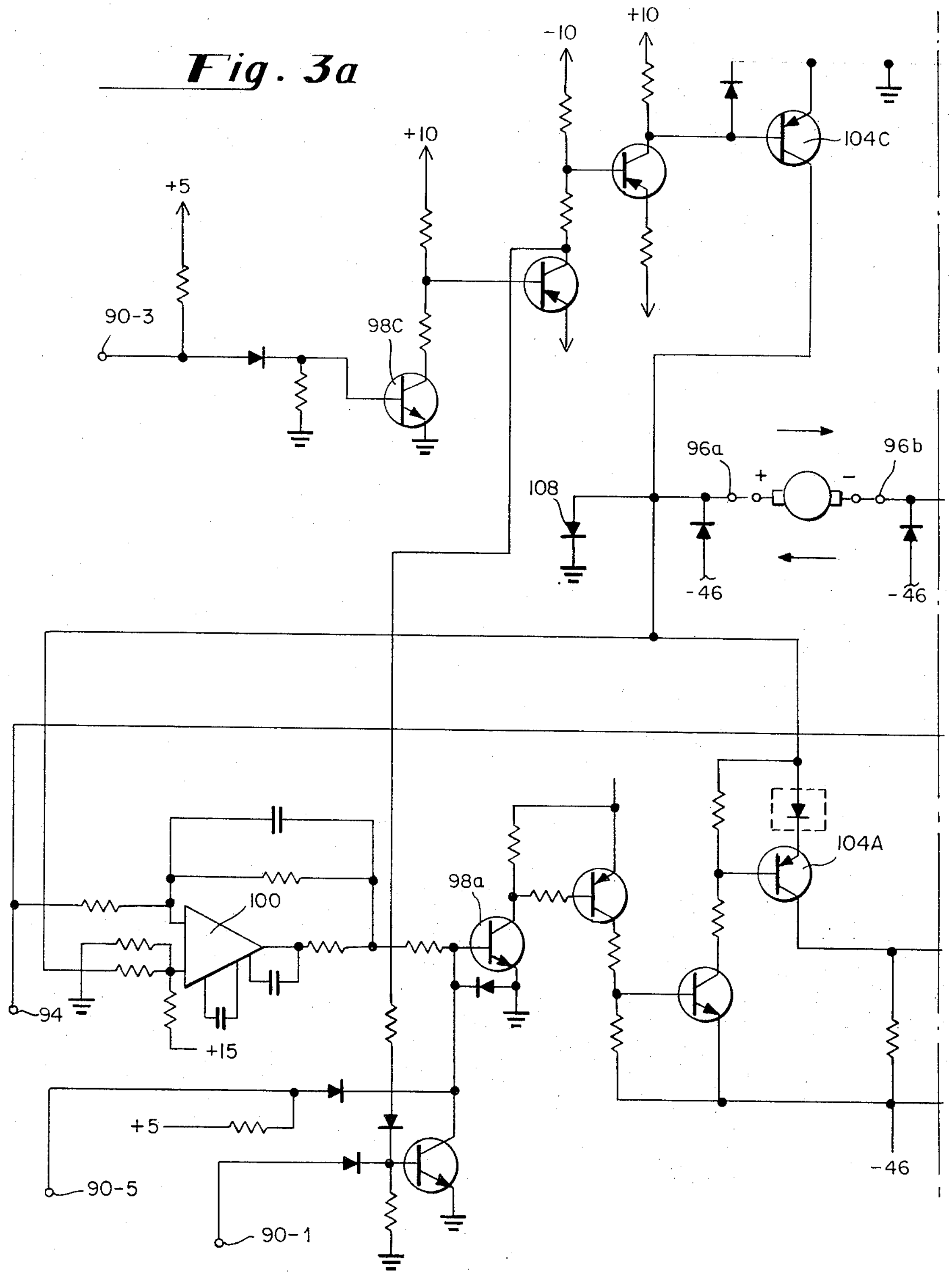
FIGS. 3*a* and 3*b* are split schematic diagrams of the power amplifier shown in block diagram form in FIG. 1.
Figure 3B:
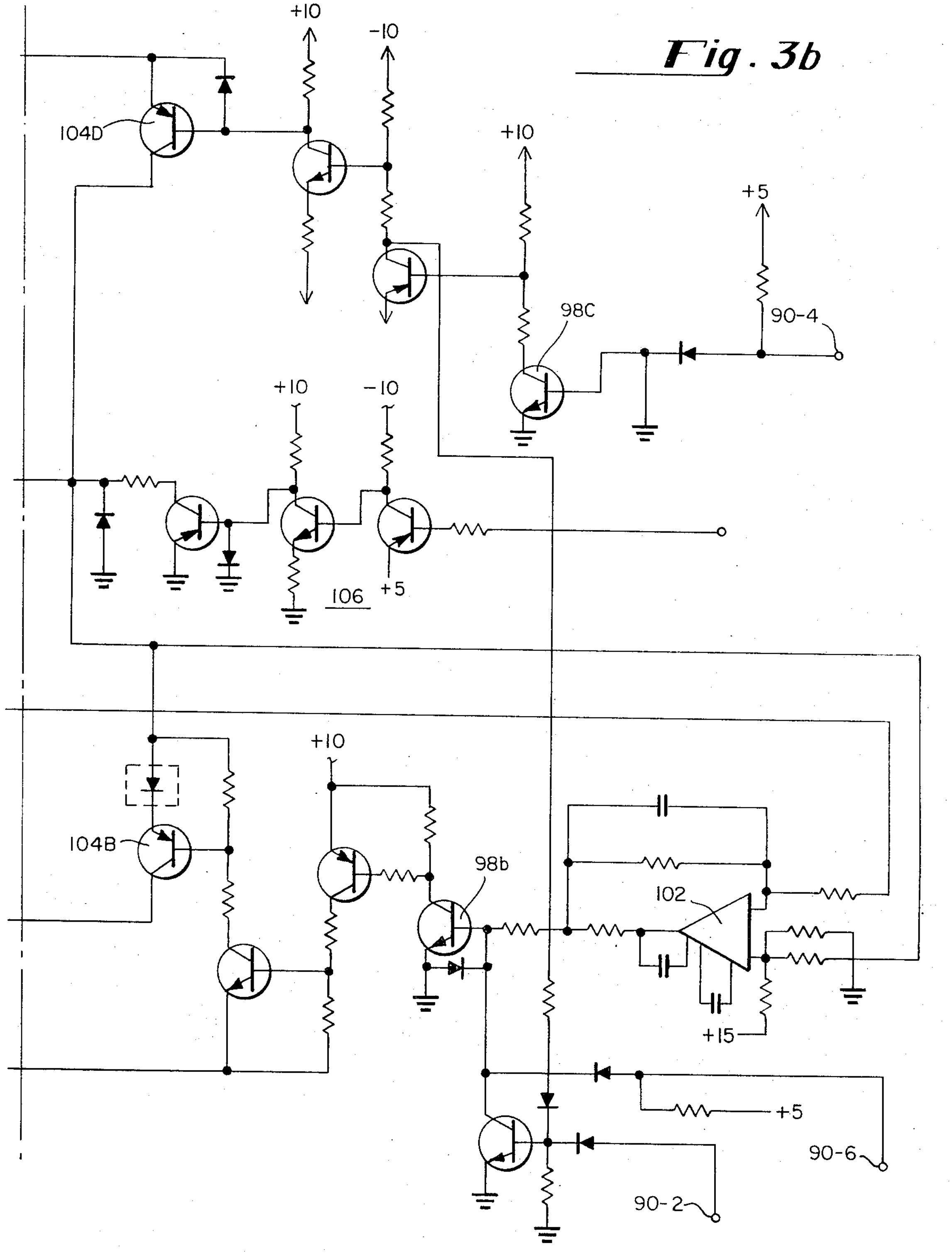

As mentioned previously, the capstan control circuit 42 provides linear control for the capstan motor 18 through the power amplifier 44 only when a predetermined velocity level has been reached as indicated by the output of the EXCLUSIVE-OR gate 46. This use of linear control in combination with fixed high power control below the predetermined velocity level will now be described in detail with reference to the power amplifier 44 as shown in detail in FIG. 3.

Before proceeding with a discussion of the circuitry involved in the power amplifier 44, it should be understood that the power amplifier operates in various modes which are controlled by logic signal inputs 90(1–6) available in a conventional tape drive such as the IBM 2420 Model 5 tape unit. These various modes are described below in terms of logic levels "UP" and "DOWN" for the various logic signal inputs 90(1–6):

| | |
|---|---|
| 1. Forward High Power Drive | |
| – Drive A DOWN | (90-1) |
| – Drive B UP | (90-2) |
| + Drive C DOWN | (90-3) |
| + Drive D UP | (90-4) |
| + Fwd H.P. Drive UP | (90-5) |
| + Bkwd H.P. Drive DOWN | (90-6) |
| 2. Forward Linear Drive | |
| – Drive A DOWN | (90-1) |
| – Drive B UP | (90-2) |
| + Drive C DOWN | (90-3) |
| + Drive D UP | (90-4) |
| + Fwd. H.P. Drive DOWN | (90-5) |
| + Bkwd. H.P. Drive DOWN | (90-6) |
| 3. Plug on the write stop — the write operation is only performed in the forward direction so plug consists of a backward high power drive. | |
| 4. Dynamic Brake | |
| – Drive A UP | (90-1) |
| – Drive B UP | (90-2) |
| + Drive C UP | (90-3) |
| + Drive D UP | (90-4) |
| + Fwd. H.P. Drive DOWN | (90-5) |
| + Bkwd. H.P. Drive DOWN | (90-6) |
| 5. Backward High Power Drive | |
| – Drive A UP | (90-1) |
| – Drive B DOWN | (90-2) |
| + Drive C UP | (90-3) |
| + Drive D DOWN | (90-4) |
| + Fwd. H.P. Drive DOWN | (90-5) |
| + Bkwd. H.P. Drive UP | (90-6) |
| 6. Backward Linear Drive | |
| – Drive A UP | (90-1) |
| – Drive B DOWN | (90-2) |
| + Drive C UP | (90-3) |
| + Drive D DOWN | (90-4) |
| +Fwd. H.P. Drive DOWN | (90-5) |
| + Bkwd. H.P. Drive DOWN | (90-6) |

The operation of the power amplifier 44 which is characterized by an "H" configuration including transistors 104A, 104B, 104C and 104D will now be described for various modes. Upon applying a "Go" logic signal to the input of the AND gate 32 as shown in FIG. 1, the power amplifier 44 is conditioned for the "Forward High Power Drive" as described in mode one above. Note that the "Forward High Power Drive" logic signal applied to the terminal 90–5 is UP so as to drive a transistor 92 into saturation and bypass the linear control provided by any error signal applied at input terminal 94. (The signal applied should be clamped to correspond to the "192" count). During this period, the power amplifier 44 is saturated and a high power drive provided between terminals **96*a* and 96*b* accelerates the capstan to the predetermined velocity. The Forward High Power Drive mode one will be terminated when the "+ Forward H.P. Drive" signal goes down as determined by the failure of the register to accumulate the number of counts corresponding to the predetermined velocity during two successive reset pulses to the counter 34. Note that the " – Drive B" signal is UP to ground the base of the first transistor 98B thereby preventing the linear control through the transistor 98**B.

After the "Forward High Power Drive" signal goes DOWN, the transistor 92A comes out of saturation and the error signal generated by the capstan control circuit is applied to an operational amplifier 100. The power amplifier now operates in the linear region under linear control of the capstan control circuit with the output of the power amplifier being proportional to the amplitude of the error signal generated by the capstan control circuit. The capstan velocity increases to the desired steady-state velocity for the particular operation in which the tape drive is operating (read or write) until the go line falls. If the capstan exceeds the predetermined steady-state velocity, the linear drive provided by the power amplifier 44 at the output terminals 96*a* and 96*b* goes to zero and the motor coasts until the velocity drops below that desired steady-state velocity.

The operation of the power amplifier 44 in the Backward High Power Drive and Backward Linear Drive modes five and six is similar except that the logic levels are reversed. As a result, the transistor 98*a* base is grounded during the Backward High Power Drive mode five while the transistor 98*b* is saturated. During Backward Linear Drive, the transistor 98*b* comes out of saturation and the error signal from the capstan control circuit is applied to the input of an operational amplifier 102.

Stopping of the capstan is achieved by the plugging and dynamic braking modes three and four. Plugging which only applies to stopping the capstan after a writing operation involves the application of the "Backward High Power Drive" as described for mode five. Note that plugging is only performed when the tape is moved in the forward direction. The duration of the plugging as determined by the Backward High Power Drive mode logic signals may be controlled by a single shot multi-vibrator described in copending application Ser. No. 161,480, filed July 12, 1971.

Dynamic Braking as described as mode four occurs whenever the "GO" logic signal applied to the AND gate 32 in FIG. 1 drops unless plugging occurs. At that time, the transistors 104C and 104D become conductive in response to the logic signals "+ Drive C" and "+ Drive D" to short out the terminals 96*a* and 96*b*. The logic circuitry is so arranged that the power amplifier 44 will go into a dynamic braking mode whenever the "GO" signal to the AND gate 32 drops. This reduces the possibility of the capstan being moved by extraneous disturbances.

It should be understood that the high speed rewind operation previously described with respect to capstan control circuit is only initiated when the power amplifier 44 is operating in the Backward Linear Drive Mode six. When the high speed rewind operation is completed, the "+ Step Up" signal and the "– Step Down" signal drops turning on a low current braking circuit including transistors 106. The back e.m.f. polarity of the motor 18 between the terminals 96*a* and 96*b* causes a braking diode 108 to conduct and the motor speed to drop to the steady-state velocity for the read and write operations in a very short period of time (e.g., 0.33 milliseconds).

It should also be understood that logic circuitry, obvious to those of ordinary skill in the art, can provide the various logic signals which control the operation of the tape drive, i.e., "– Step Up," etc.

Although a particular embodiment has been disclosed in this specification, it will be understood that other embodiments and modifications in the embodiment disclosed fall within the scope of the invention as set forth in the appended claims.

What is claimed is:

1. In a high performance magnetic tape drive comprising a magnetic head, a capstan for driving tape past said magnetic head, a capstan motor for driving said capstan, and a capstan control system for controlling said capstan motor comprising:

a tachometer means for generating a series of tachometer pulses having a frequency representing the capstan velocity;

a clock pulse means for generating clock pulses between said tachometer pulses;

a counter means for counting the number of said clock pulses generated between said tachometer pulses;

a digital-to-analog converter means for generating an analog signal representing the count accumulated in said counter means;

a means for generating an error signal having a component substantially proportional to the difference between said analog signal and a reference signal; and a power amplifier means having an input and an output, said error signal generating means being coupled to said input and said capstan motor being coupled to said output to provide linear control of said capstan motor.

2. The capstan control system of claim 1 wherein the output of said power amplifier means provides high power substantially fixed control below a predetermined capstan velocity independent of said error signal and low power substantially linear control above said predetermined capstan velocity responsive to said error signal.

3. The capstan control system of claim 2 wherein said error signal also comprises a component substantially proportional to the integral of said difference between said analog signal and said reference signal.

4. The capstan control system of claim 3 wherein said means for generating an error signal comprises:

a comparison means having an input and an output, said analog signal and said reference signal being coupled to the input of said comparison amplifier; and an integrating means having an input connected to the output of said comparison means, said counter means being present to a count greater than the count representing desired steady-state velocity for a particular operation to prevent accumulation of a large error signal at said integrating means while the capstan velocity is below said predetermined velocity.

5. The capstan control system of claim 1 further comprising a source of said reference signal providing a reference signal having a first substantially constant signal level during read and write operations and a linearly increasing signal level to a second substantially constant signal level higher than said first signal level during a rewind of operation.

6. The capstan control system of claim 1 wherein said source of said reference signal supplies said digital-to-analog converter means generating an error signal during the read and write of operations so as to render any deviations in said reference signal self-cancelling.

7. The capstan control system of claim 6 wherein said digital-to-analog converter comprises a ladder network having a plurality of transistors and associated output resistors connected to and controlled by said register means, said transistors associated with smaller resistors corresponding to higher counts so as to be in the non-conductive state as said capstan motor approaches the steady state velocity thereby eliminating the effect of saturated transistor voltage drops on said error signal.

8. In a high performance magnetic tape drive comprising a magnetic head, a capstan for driving tape past said magnetic head, a capstan motor for driving said capstan, and a capstan control system for driving said capstan motor comprising:

a power amplifier capable of operating in a linear region and a saturated region;

a means for generating an analog signal representing the instantaneous velocity of said capstan;

a signal source for generating a reference signal representing a reference capstan velocity;

a means for comparing said analog signal and said reference signal and generating an error signal applied to said power amplifier and having a component proportional to the difference between said instantaneous capstan velocity and a reference capstan velocity and a component proportional to the integral of said difference;

a means for operating said power amplifier in said saturated power region thereby driving said motor independently of said error signal when said instantaneous capstan velocity is below a predetermined level; and a means for operating said power amplifier in said linear region in response to both said proportional and integral components thereby driving said motor in response to said error signal when the instantaneous capstan velocity is equal to or above said predetermined level.

9. The capstan control system of claim 8 wherein said means for comparing said analog signal and said reference signal comprises:

a comparison amplifier means having an input coupled to said means for generating an analog signal and said signal source; and an integrating amplifier means having an input connected to the output of said comparison amplifier means.

10. The capstan control system of claim 9 wherein said signal source comprises:

a means for generating a reference signal of constant amplitude during the read and write modes for said tape drive; and a means for generating a linearly increasing reference signal when said tape drive is switched from the read or write mode to the rewind mode, said reference signal increasing linearly to a constant level.

* * * * *

PO-1050
(5/69)

UNITED STATES PATENT OFFICE
CERTIFICATE OF CORRECTION

Patent No. 3,764,876 Dated October 9, 1973

Inventor(s) WILLIAM C. ARTHUR

It is certified that error appears in the above-identified patent and that said Letters Patent are hereby corrected as shown below:

Column 10, line 53, "present" should be --preset--.

Signed and sealed this 2nd day of April 1974.

(SEAL)
Attest:

EDWARD M.FLETCHER,JR.
Attesting Officer

C. MARSHALL DANN
Commissioner of Patents